Dec. 11, 1923.

J. COLLA 1,477,037

BRAKE CONTROL FOR FRONT WHEELS OF MOTOR VEHICLES

Filed Sept. 11, 1922    2 Sheets-Sheet 1

INVENTOR.
Joseph Colla

By William C. Linton
Attorney.

Dec. 11, 1923.

J. COLLA 1,477,037

BRAKE CONTROL FOR FRONT WHEELS OF MOTOR VEHICLES

Filed Sept. 11, 1922     2 Sheets-Sheet 2

INVENTOR.

Joseph Colla

By William C. Linton.
Attorney.

Patented Dec. 11, 1923.

1,477,037

UNITED STATES PATENT OFFICE.

JOSEPH COLLA, OF ISSOIRE, FRANCE.

BRAKE CONTROL FOR FRONT WHEELS OF MOTOR VEHICLES.

Application filed September 11, 1922. Serial No. 587,515.

*To all whom it may concern:*

Be it known that I, JOSEPH COLLA, residing at Issoire, France, have invented new and useful Improvements in Brake Controls for Front Wheels of Motor Vehicles, of which the following is a specification.

My invention relates to a brake control for front wheels of motor vehicles, said wheels assuming a variable direction with respect to the axle. Its principal advantage consists in the fact that the action of the control on the brakes is independent of the position occupied by the wheel at the time of braking.

According to the invention the brakes on the two front wheels are in fact actuated by a single flexible driving device, for example a metal cable, mounted upon pulleys which are so disposed that in all positions of the wheel with respect to the axle, the attaching point of the driving device to the brake drum will remain at the same distance from the outer pulley. The flexible driving device acts upon a lever controlling a cam which is disposed between the free ends of a pair of brake shoes contained in the drum and pivoting on a common axle. The cam separates the shoes and presses them against the inner walls of the drum, thus braking the wheels. The lever controlling the said flexible braking device is operated in the direction of the axis of the vehicle, whereby the braking action takes place at the same time upon the two wheels.

The following description, together with the accompanying drawings which are given by way of example, sets forth this invention.

Figure 1:
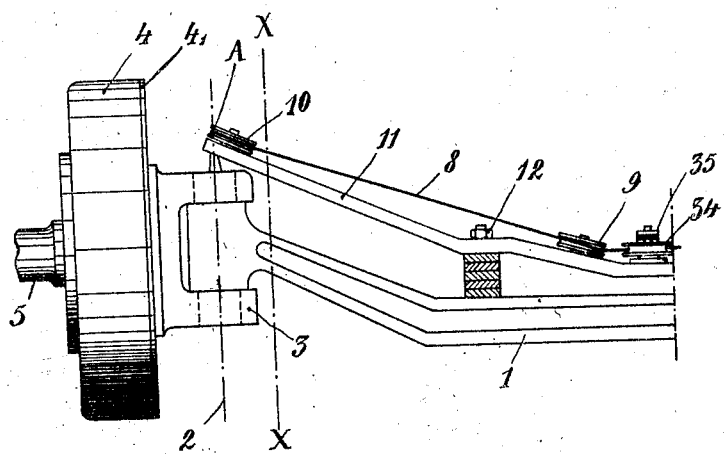
Fig. 1 is an elevational view of a portion of the front axle with the brake drum mounted upon the wheel.

In the figures, 1 indicates the front axle of the vehicle, 2 the geometrical pivoting axis of the wheel, 3 the fork and 4 the brake drum secured to the journal 5 of the wheel.

The cable 8 constituting the flexible drive of the brake, is disposed upon the pulleys 9 and 10 which are mounted on a cross-piece 11 secured by bolts 12 to the vehicle springs. The pulley 10 is so disposed that the point A where the cable leaves the pulley is located upon the pivoting axis 2 of the wheel. The cable 8 is secured to an eye-bolt 17, Figs. 2, 3 and 5, to which is screwed a wing-nut 19 for regulating the tension of the cable, said eye-bolt engaging an aperture 20 in the arm 21 of a sleeve 23 which is keyed to the rod 22 controlling the cam 24, Fig. 4. The combination of rod 22 and said sleeve is revoluble in the socket 25 which is permanently secured to the wall $4_1$ of the drum 4.

Figure 4:
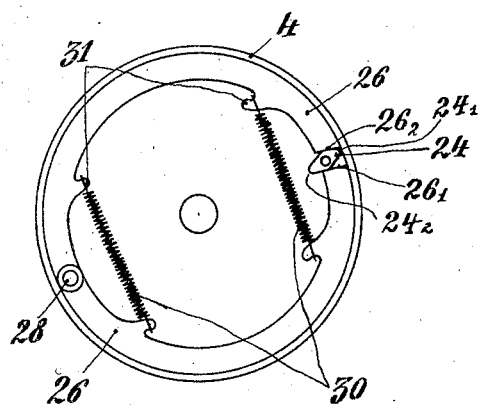
Fig. 4 shows the brake members contained in the drum.

The brake properly so called is formed of two substantially semicircular members 26, Fig. 4, operating upon a common pivot 28. The outer part of said brake members which constitutes the active surface, is situated close to the inner surface of the drum 4. A certain space is provided between the said brake members wherein is disposed the said cam, which is thus situated between the opposite end surfaces $26_1$ $26_2$. The said brake members are returned to the original position after the braking action has taken place by means of the two coiled springs 30 secured to lugs 31 on said brake members.

The control of the cable is effected according to the longitudinal central plane of the vehicle (Fig. 2), by means of the connection 33 which moves (in the direction of the arrow F) under influence of an operating lever, not shown, a pulley 34 having disposed thereon the cable 8 which is common to both wheels of the axle; said pulley is provided with a braking device 35 constituted by a spring coiled about the same and pressed on it.

This braking device has for its object to interfere with the rotation of the pulley 34 about its axis. so as to compensate the differences existing in the tension of springs or in the friction between the left and the right brake mechanism.

Figure 2:
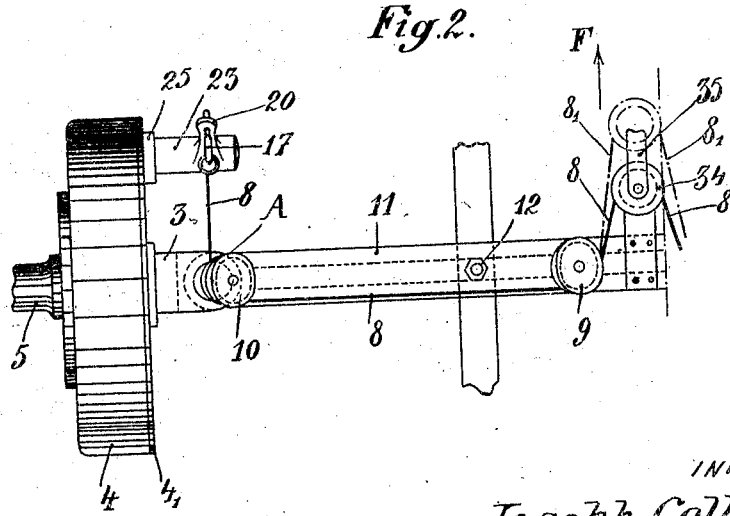
Fig. 2 is a plan view of the same portion of the axle.
Figure 3:
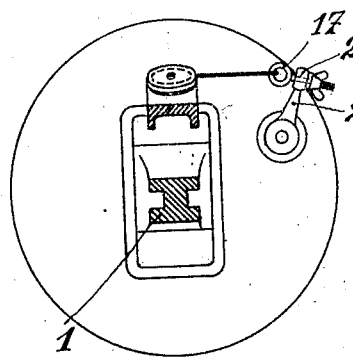
Fig. 3 is a section on the axis X—X of Fig. 1.
Figure 5:
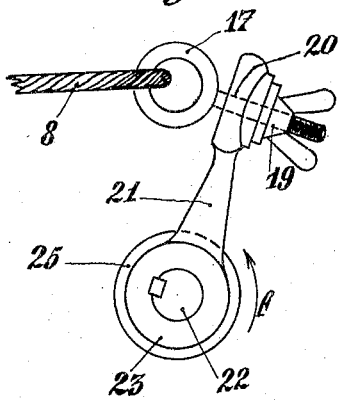
Fig. 5 is a detail view showing the method of mounting the flexible drive on the lever determining the degree of separation of said brake members.

The operation of said arrangement is as follows:

When the driver desires to throw the brakes on the front wheels, he actuates the operating lever and in consequence, the connection 33 in the direction of the arrow F, thus moving the cable 8 which now occupies the position $8_1$, Fig. 2, and this increases the distance between pulleys 34 and 9, subjecting the cable to a pull whereby the wing-nut 19 comes against the edges of the aperture 20, thus producing the rotation of the arm 21 in the direction of the arrow $f$, Fig. 5. The rod 22 and cam 24 are actuated by the rotation of the arm 21, and the ends $24_1$, $24_2$ of the cam are caused to bear respectively upon the surfaces $26_1$, $26_2$ of the brake members, so as to separate the latter by pivoting on the common axis 28. The outer part of said brake members comes against the inner surface of the rotating brake drum, thereby stopping the latter together with the corresponding vehicle wheel.

It will be observed that a great distance exists between the parts where the cross-piece 11 is fixed by bolts 12 and the end of same bearing the pulley 10. Consequently, when the braking operation begins, the outer arms of the cross-piece 10 bends and thus it contributes to perform a progressive-braking of the wheel.

Besides the device in conformity with the invention is of a very simple nature, and its principal advantage consists in its property of providing uniform braking effects for all positions occupied by the wheels and of having no effect upon the direction of the same; these effects are moreover symmetrical for the two wheels, since a single control element is used, and this is operated in the plane of symmetry of the vehicle. Another point to be noted is that in the event of breakage of the cable, both wheels will be released at the same time. The length of the cable can be regulated without any lifting of the wheels, since it is simply necessary to turn the nut 19 in the proper direction.

Obviously, the said invention is susceptible of modifications in detail without departing from the general principle, in order to adapt the same to any suitable type of vehicle frame, and in particular, the cross-piece 11 carrying the pulleys can be eliminated by employing a table shaped axle.

I claim:

1. The combination with the front axle of an automobile having a steering wheel journal pivotally connected thereto carrying a braking drum, braking mechanism adapted to cooperate with said drum having a rotatable operating rod, of a cross-piece secured to and arranged longitudinally of the front axle having an end portion thereof overlying the pivotal connection of the steering wheel journal, pulleys mounted on the end portion of said cross-piece and the intermediate portion thereof, and a cable passing over said pulley and connected to said rotatable operating rod.

2. The combination with the front axle of an automobile having a steering wheel journal pivotally connected thereto carrying a braking drum, braking mechanism adapted to cooperate with said drum having a rotatable operating rod, of a cross-piece secured to said axle and having a free end, a pulley mounted upon said free end of the cross piece, and a cable extending over said pulley and connected to said rotatable operating rod.

3. The combination with the front axle of an automobile, a steering wheel journal pivotally connected thereto, steering wheel braking mechanism carried by said journal, of a cross-piece secured to said axle having a flexible end overlying the pivot connection between said journal and axle, and a cable connecting said flexible end of the cross-piece with said braking mechanism.

In witness whereof I affix my signature.

JOSEPH COLLA.